Figure 1:
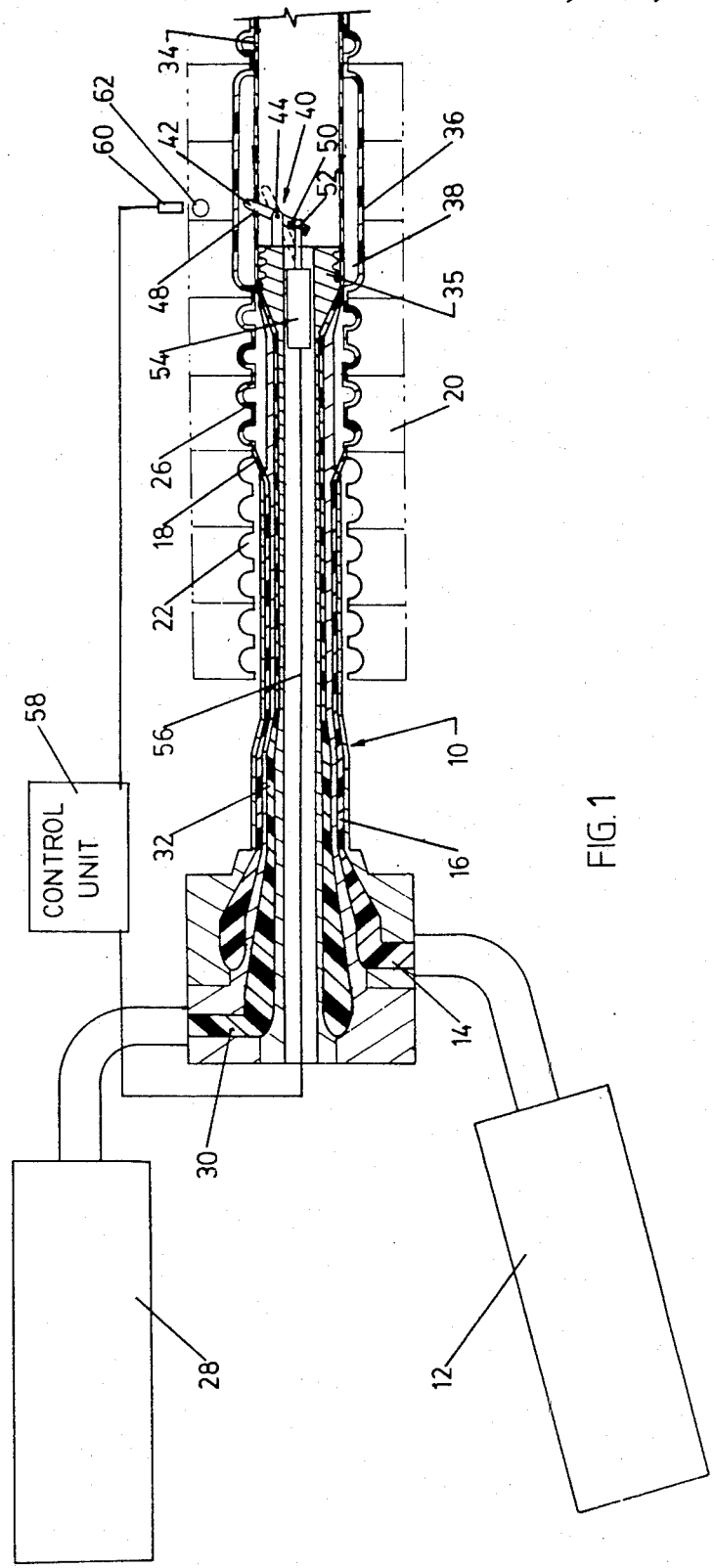

United States Patent [19]

Lupke

[11] Patent Number: 4,500,284
[45] Date of Patent: Feb. 19, 1985

[54] FORMING SINGLE WALL BELLS IN DOUBLE WALL PIPE

[76] Inventor: Manfred A. A. Lupke, 35 Ironshield Cres., Thornhill, Canada, L3T 3K7

[21] Appl. No.: 532,857

[22] Filed: Sep. 16, 1983

[51] Int. Cl.³ .................. B29C 5/06; B29C 17/07; B29C 17/14; B29D 23/03
[52] U.S. Cl. .................. 425/511; 156/244.14; 156/244.18; 425/504; 425/505; 425/133.1; 425/142; 425/290; 425/326.1; 425/336; 425/503
[58] Field of Search ............... 425/290, 532, 336, 503, 425/504, 511, 133.1, 142, 326.1, 336, DIG. 218, 505; 264/508, 154, 156; 156/244.14, 244.15, 244.18, 87

[56] References Cited

U.S. PATENT DOCUMENTS

| 3,479,422 | 11/1969 | Zavasnik | 425/504 |
| 3,538,209 | 11/1970 | Hegler | 264/508 |
| 4,184,831 | 1/1980 | Hegler et al. | 425/290 |
| 4,226,580 | 10/1980 | Lupke et al. | 425/504 |

FOREIGN PATENT DOCUMENTS

| 1083776 | 8/1980 | Canada. | |
| 2424640 | 4/1975 | Fed. Rep. of Germany | 264/156 |
| 2934813 | 3/1981 | Fed. Rep. of Germany | 264/154 |
| 2144606 | 2/1973 | France | 425/290 |

Primary Examiner—Jan Silbaugh
Assistant Examiner—Hubert C. Lorin

[57] ABSTRACT

A method and an apparatus for producing double walled thermoplastic pipe with integral bells are disclosed. The pipe has corrugated outer wall that has the bells molded into it, and a smooth inner wall. The inner wall is removed from the bell after the pipe is formed and set. During production, the inner wall is punctured along the bell section to admit air into the chamber between the two walls. This prevents collapse of the outer wall due to reduced air pressure as the air in the chamber cools.

2 Claims, 2 Drawing Figures

FORMING SINGLE WALL BELLS IN DOUBLE WALL PIPE

The present invention relates to a method of making a thermoplastic pipe by molding an outer wall to provide corrugated sections separated by bell sections and extruding a smooth inner wall into the outer wall.

The present invention provides a single walled bell, formed only in the outer wall. The inner wall is not subjected to the action of an internal presser and is removed either wholly or in part from the bell section after the pipe is formed.

The production of a single wall bell is subject to the problem that as the pipe cools, the air pressure in the chamber between the outer and inner walls reduces considerably, tending to collapse the outer wall before it is completely set. The present invention solves this problem by providing a method of the above type including the step of puncturing the inner wall in each bell section before substantial cooling of the pipe to admit air into the chamber between the inner and outer walls.

The present invention also relates to an apparatus for carrying out the method, including a travelling mold with a cavity having corrugated sections separated by bell sections, means for molding an outer pipe wall into the cavity and means for extruding an inner, smooth wall into the outer wall. The apparatus is characterized by a cutter mounted within the mold cavity downstream of where the inner wall is extruded and an actuator for actuating the cutter to puncture the wall.

In preferred embodiments, the actuator includes a sensor that is actuated when a bell section is adjacent to the cutter and means responsive to actuation of the sensor to actuate the cutter.

The actuator may include a pneumatic cylinder for moving the cutter between retracted and extended positions.

Figure 2:
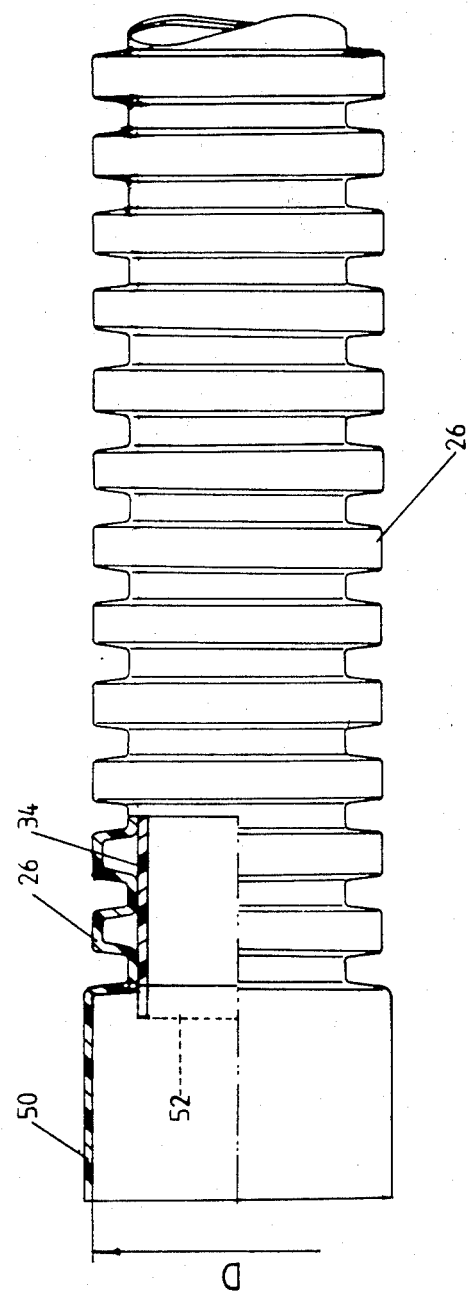

In the accompanying drawings, which illustrate an exemplary embodiment of the present invention:

FIG. 1 is a schematic sectional view of an apparatus according to the present invention; and FIG. 2 is a side view, partially in section, of a pipe constructed according to the present invention.

Referring to the accompanying drawings, and particularly to FIG. 1, there is illustrated a pipe forming apparatus including a double wall die such as that described in Canadian Patent No. 1 083 766 issued Aug. 19, 1980 to G. P. H. Lupke et al. The die is coupled to an outer wall extruder that extrudes a flow of thermoplastic material 14 for formation by the die into an annular flow 16 and ultimate extrusion as a tube 18 into the cavity 22 of a travelling mold 20. The tube 18 is molded into the cavity to provide a corrugated outer wall 26.

The die is also coupled to an inner wall extruder 28 that serves to extrude a flow of thermoplastic 30 that is formed into an annular flow 32 in the die and extruded as a smooth inner wall 34 onto the inside of the corrugated outer wall 26.

As thus far described, the system is a known system for producing double wall thermoplastic pipe. In the present system, the travelling mold 20 includes at least one bell forming cavity into which the tube 18 is molded to form bell sections in the outer wall. The inner wall 34 is extruded over a core plug 35 and bridges the bell section in the outer wall to form a closed annular chamber 38 between the molds. As the pipe cools, the air in the chamber 38 also cools, reducing the air pressure within the chamber and tending to collapse the chamber by deformation of the walls. To prevent this deformation, the apparatus includes a cutter 40 that is automatically operated to puncture the inner wall to admit air into the chamber 38.

In the illustrated embodiment, the cutter 40 includes a blade 42 pivotly mounted on a bracket 44 extending from the downstream end of the core plug 35. The blade has a sharpened cutting end 48 that may pivot outwardly to engage and puncture the inner wall 34. The other end of the blade has a slot 50 engaging a pin 52 on the rod of an air cylinder 54. The air cylinder is mounted on the inside of the core plug 35 and is supplied with air from a line 56 extending through the hollow core of the die 10 and to a control valve included in the control unit schematically illustrated at 58.

The control unit 58 is actuated by a sensor 60 mounted adjacent to the travelling mold 20 to detect the passage of a magnet 62 on one of the moldblocks forming the bell section 36. Upon detection of the magnet 62, the sensor 60 signals the control unit 58 to open the control valve, thus pressurizing the line 56 and operating the air cylinder. This pivots the blade 42 outwards to pierce the inner wall 34 of the pipe. The control valve is then closed and the air cylinder exhausted. The cylinder is equipped with an internal spring to return it to its starting position, drawing the blade into a retracted position as illustrated in broken line in FIG. 1.

To ensure proper timing of the cutter actuation with different mold setups, the sensor's position is adjustable. In the illustrated embodiment, it is located to initiate operation of the cutter after the inner wall 34 has bridged the bell section 36 to close the cavity 38. This prevents an excessive loss of the pressurized air that is used for blow molding the outer wall. In other embodiments, the outer wall may be vacuum formed and the knife may be operated at other times in the molding sequence.

FIG. 2 of the accompanying drawings illustrates a pipe produced according to the invention. The pipe includes a corrugated outer wall 26 with a bell 50 at one end and a smooth inner wall 34 that is removed over the length of the bell after the pipe is formed and set.

The inner diameter of the bell section 50 matches the outer diameter of the corrugated section of the pipe, so that the bell will be snug fit over the corrugated end of another section of the pipe. Where desired, the inner wall may extend part way into the bell section 50 as illustrated in broken line at 52 in FIG. 2. The inserted pipe end will then abut the end of the inner wall to provide a continuous, smooth bore through the coupling.

While one embodiment of the pipe according to the present invention and one embodiment of an apparatus for producing the pipe have been illustrated in the foregoing, it is to be understood that other embodiments are possible. For example, a bell section may have one or more grooves for accomodating sealing rings that will in turn seal in the corrugations of a mating pipe. The cutter need not be pneumatically operated, but can be actuated in any convenient way.

I claim:

1. An apparatus for producing a double-walled thermoplastic pipe having a corrugated outer wall and a substantially smooth inner wall secured to the latter, including extruders for said walls, a core plug over which the inner wall is extruded, and a travelling mold defining a cavity having corrugated sections, wherein the latter are separated with at least one bell section to produce accordingly said outer wall with corrugated and bell sections means for conforming said outer wall to said cavity, said plug being provided with a cutter mounted downstream and having an actuator to puncture the inner wall in said bell section in order to admit air into a chamber of the latter between its outer and inner walls.

2. The apparatus of claim 1 wherein said actuator is provided with a sensor actuable with said bell section of the mold for switching the actuator on.

* * * * *